United States Patent
Takahashi

(10) Patent No.: US 7,728,584 B2
(45) Date of Patent: Jun. 1, 2010

(54) ROTATION SENSOR AND BEARING ASSEMBLY USING THE SAME

(75) Inventor: Toru Takahashi, Iwata (JP)

(73) Assignee: NTN Corporation, Osaka (JP)

(*) Notice: Subject to any disclaimer, the term of this patent is extended or adjusted under 35 U.S.C. 154(b) by 165 days.

(21) Appl. No.: 11/990,333

(22) PCT Filed: Aug. 2, 2006

(86) PCT No.: PCT/JP2006/315315

§ 371 (c)(1),
(2), (4) Date: Feb. 12, 2008

(87) PCT Pub. No.: WO2007/020803

PCT Pub. Date: Feb. 22, 2007

(65) Prior Publication Data

US 2009/0102468 A1 Apr. 23, 2009

(30) Foreign Application Priority Data

Aug. 17, 2005 (JP) .............................. 2005-236628

(51) Int. Cl.
*G01B 7/30* (2006.01)
*G01N 27/72* (2006.01)
*G01P 3/52* (2006.01)

(52) U.S. Cl. ................... 324/207.25; 324/225; 324/173

(58) Field of Classification Search ............ 324/207.25, 324/225, 173
See application file for complete search history.

(56) References Cited

FOREIGN PATENT DOCUMENTS

| JP | 5-128342 | 5/1993 |
|----|----------|--------|
| JP | 2003-148999 | 5/2003 |
| JP | 2004-37133 | 2/2004 |
| JP | 2004-239699 | 8/2004 |
| JP | 2005-43070 | 2/2005 |
| JP | 2005-140737 | 6/2005 |

OTHER PUBLICATIONS

International Search Report (PCT/ISA/210) mailed Sep. 19, 2006 in connection with the International Application PCT/JP2006/315315.
International Preliminary Report on Patentability issued in corresponding International Patent Application No. PCT/JP2006/315315, mailed on Feb. 28, 2008.

*Primary Examiner*—Reena Aurora

(57) ABSTRACT

A rotation sensor includes a magnetic sensor array including magnetic sensor elements in line, a rotatable magnet confronting the magnetic sensor array, a signal readout circuit to read out a signal from the magnetic sensor array, a repeating section to cause the signal readout circuit to repeat reading out the signal from the magnetic sensor array several number of times, and to calculate a summation or an average of several readout signals, and an angle calculating circuit to detect an angle of rotation of the magnet from the summation or the average of the signals calculated by the repeating section.

5 Claims, 5 Drawing Sheets

ROTATION SENSOR AND BEARING ASSEMBLY USING THE SAME

CROSS REFERENCE TO RELATED APPLICATIONS

This application claims the benefit under 35 U.S.C. Section 371, of PCT International Application Number PCT/JP2006/315315, filed Aug. 2, 2006 and Japanese Application No. 2005-236628 filed Aug. 17, 2005 in Japan, the contents of which are incorporated herein by reference.

FIELD OF THE INVENTION

The present invention relates to a device for detecting the rotation utilizable with various equipments and, more particularly, to the rotation sensor for use in controlling the rotation of, for example, a compact drive motor for use in detecting the rotation for detecting the position of, for example, a business machine. The present invention also relates to a bearing assembly utilizing such rotation sensor.

BACKGROUND OF THE INVENTION

As a rotation sensing device capable of being incorporated into small-sized equipment and detecting an angle of rotation with high precision, a device utilizing a sensor arrays has been suggested (e.g. Japanese Laid-Open Patent Publication No. 2003-148999). This known device includes sensor arrays having a large number of arrayed magnetic sensor elements (MAGFET) integrated on a sensor chip together with a signal amplifying circuit, an analog-to-digital (A/D) converter circuit and a digital signal processing circuit, in which the sensor chip is arranged in face-to-face relation with magnetic generating means mounted on a rotatable member. With the rotation sensor of known structure discussed above, the magnetic sensor arrays detect distributions of magnetic fields generated by the magnet generating means, and from the distributions an angle of rotation of the magnet generating means are detected.

However, in a semiconductor circuit of the sensor, a thermal noise or a 1/f noise generated by the circuit is superimposed on output signals from the sensor elements integrated on a silicon chip, and therefore the accuracy of measuring the angle of rotation tends to be reduced.

Accordingly, there have been suggested: a device where the magnetic sensor elements in the above-mentioned sensor arrays are arranged in line to increase an effective area of the sensor and thus reduce the 1/f noise, so as to avoid the reduction of accuracy (e.g. Japanese Laid-Open Patent Publication No. 2004-037133); and a device where a plurality of magnetic sensor lines are arranged in parallel and each of the averages of outputs from sensor elements in the sensors line is calculated, so as to avoid the reduction of accuracy (e.g. Japanese Laid-Open Patent Publication No. 2005-043070).

SUMMARY OF THE INVENTION

However, even in the case where the magnetic sensor elements are arranged in line or a plurality of magnetic sensor lines are arranged in parallel as disclosed in Japanese Laid-Open Patent Publication No. 2004-037133 or Japanese Laid-Open Patent Publication No. 2005-043070, an amount of noise generated by a signal readout circuit in a subsequent step cannot be reduced, resulting in insufficient in the accuracy.

In addition, it is possible that angle values obtained by processing readout signals are stored and the stored several values are averaged, to decrease deviations in detected angles. However, when the average is calculated from n stored values, n times of sequences, each consisting of signal reading and subsequent processing of the signal, are required, resulting in a reduction of an angle measurement rate to 1/n. On the other hand, in the case where processed results in the last n-times are averaged and outputted at the end of every processing, the detection rate does not decrease, but the processed result lags behind real time. Assuming that the cycle of angle detection is "T", n times of processing requires the time of nT, and for outputting an average value thereof, a time lag of about nT/2 is caused.

An object of the present invention is to provide a rotation sensing device capable of reducing the noise generated by a signal readout circuit to detect an angle of rotation with decreased deviations in detected angles and high accuracy, and capable of reducing a time lag in detection of the angle as much as possible, and also provide a bearing assembly utilizing the rotation sensor.

For facilitation of understanding of the present invention, each component is provided with reference numeral used in FIG. 3 showing one embodiment. The rotation sensor according to the present invention includes a magnetic sensor array 5 having magnetic sensor elements in line, a rotatable magnet confronting this magnetic sensor array 5, a signal readout circuit 11 which readouts a signal from the magnetic sensor array 5, a repeating section 13 which causes the signal readout circuit 11 to repeat reading out the signal from the magnetic sensor array 5 several number of times and calculates a summation or an average of the several readout signals; and an angle calculating circuit 14 which detects an angle of rotation of the magnet from the summation or the average of the signals calculated by the repeating section 13.

According to this construction, a series of signals are read from the magnetic sensor elements forming the magnetic sensor array 5, namely, only scanning is repeated several times, and an angle is detected by the angle calculating circuit 14 from the calculated summation or average of the series of sensor signals. Calculating the summation or the average of the sensor signals in such a manner can reduce the noise of the signal, resulting in decreasing deviation in a result of detected angle. Since the angle of rotation detecting process which is time-consuming is required only once, it is possible to reduce the noise of the sensor signals while minimizing the time lag caused by calculating the summation or the average of signals, as much as possible, so as to improve angle detection accuracy.

According to preferred embodiment, the rotation sensing device may further include a reading-out number automatic adjuster 18 which adjusts the number of times of reading-out the signal used by the repeating section 13 in accordance with an amount of change in angle. The amount of change in angle represents a difference between two successive angles of rotation of the magnet detected by the angle calculating circuit 14.

Namely, from two successively detected angles, an amount of change in detected angles (i.e. rotational speed) is obtained. For example, the number of times of scanning is reduced when the amount of change is large while the number of scanning is increased when the amount of change is small. Thus, a higher priority can be placed on minimizing the time lag in detecting the angle in the case of a fast rotation, and on the other hand, a higher priority can be placed on decreasing deviations in detected angles in the case of a slow rotation, so as to reduce noise appropriately in accordance with the rotational speed.

The bearing assembly according to the present invention is of type equipped with the above-mentioned rotation sensing device. In the bearing assembly, the magnet is arranged on a rotatable raceway member while the magnetic sensor array is arranged on a stationary raceway member.

Integrating the rotation sensing device with the bearing assembly is effective to reduce the number of components of equipment using the bearing assembly and the number of assembling steps thereof, and also to achieve reduction in size of the bearing assembly. In this case, by the rotation sensing device of the present invention, the angle of rotation can be detected with high precision while minimizing the time lag in output of the detected angle as much as possible.

BRIEF DESCRIPTION OF THE DRAWINGS

The present invention will be more clearly understood from the following description of preferred embodiments with reference to the accompanying drawings. However, the embodiments and the drawings are to be used only for the sake of illustration and explanation, and not to be used for limiting the scope of the present invention. The scope of the present invention is determined by the appended claims. In the accompanying drawings, the same reference numeral denotes the same portion throughout a plurality of views.

DESCRIPTION OF THE PREFERRED EMBODIMENTS

Figure 1:
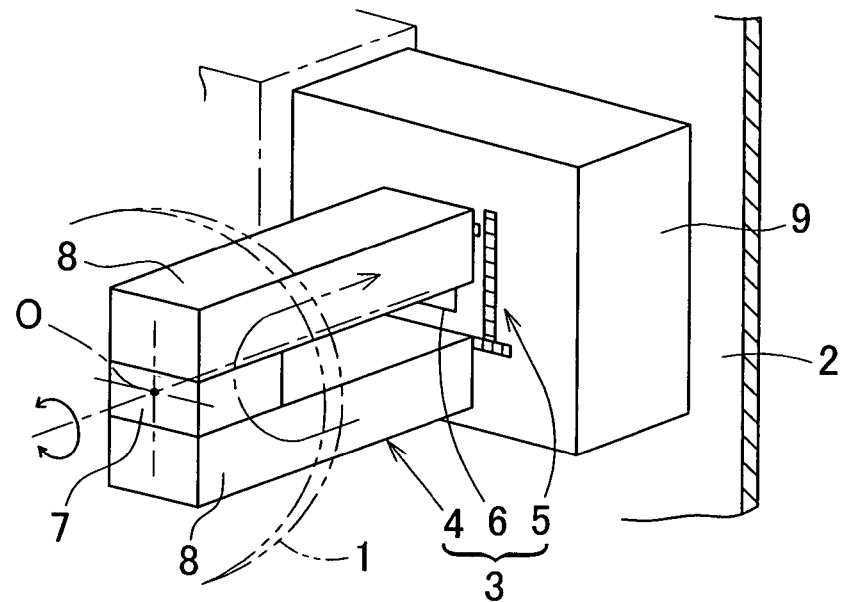
FIG. 1 is a perspective view showing a conceptual construction of a rotation sensing device according to one embodiment of the present invention.

One embodiment of the present invention will be described in detail. FIG. 1 shows a principle structure of a rotation sensing device according to one embodiment of the present invention. A rotation sensing device 3 includes a rotatable member 1 and a stationary member 2 representing a member on a rotatable side and a member on a stationary side, respectively, which are rotatable relative to each other. This rotation sensing device 3 further includes a magnetic sensor array 5 arranged on the stationary member 2; a magnet 4 which is arranged on the rotatable member 1 and is capable of rotating integrally with the rotatable member 1 with confronting the magnetic sensor array 5, and angle detector unit 6 for detecting an angle of rotation of the magnet 4 from the outputs of the magnetic sensor array. The magnetic sensor array 5 includes a plurality of magnetic sensor elements 19 arranged in line, and is slightly spaced from the magnet 4.

The magnet 4 is of a type capable of generating magnetism having a magnetic anisotropy in a circumferential direction around an axis of rotation O of the rotatable member 1, and is in the form of a single body of a permanent magnet or a composite body comprised of a permanent magnet and a magnetic material. In the illustrated embodiment, the magnet 4 includes a permanent magnet 7 sandwiched between two magnetic yokes 8 and 8 and then integrated together. The magnet 4 represents generally forked configuration, with one of the magnetic yokes 8 having an N-magnetic pole at one end thereof and one with the other of the magnetic yokes 8 having an S-magnetic pole at one end thereof. Being formed into such a structure, the magnet 4 can be constructed simple and robust. This magnet 4 is fitted to the rotatable member 1 such that the axis of rotation O of the rotatable member 1 is aligned with the longitudinal axis of the magnet 4. As a result, the N-magnetic pole and the S-magnetic pole turn around the axis of rotation O when the rotatable member 1 is rotated.

Figure 2:
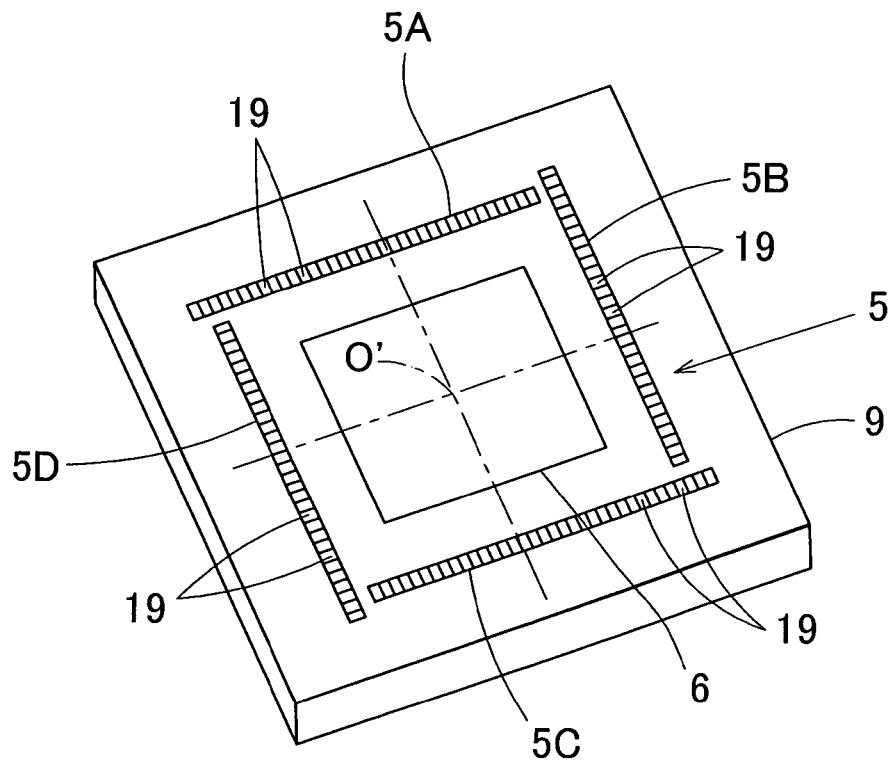
FIG. 2 is a perspective view showing a semiconductor chip in the rotation sensing device in FIG. 1.

The magnetic sensor array 5 is a sensor for detecting magnetism, that is, the presence of magnetic fields generated by the magnet 4, and arranged on the stationary member 2 so as to face the magnet 4 in a direction along the axis of rotation O of the rotatable member 1. In the embodiment, as shown in FIG. 2, the magnetic sensor array 5 includes four magnetic sensor array lines 5A to 5D and is arranged so as to occupy a position corresponding to one of four sides of an imaginary rectangle on the surface of a semiconductor chip 9. A geometric center O' of the rectangle is aligned with the axis of rotation O of the rotatable member 1. The magnetic sensor elements 19 of the sensor array lines 5A to 5D on the respective sides are made of a MAGFET (magnetic sensor elements of MAGnetic Field Effect Transistor type).

The angle detector unit 6 in FIGS. 1 and 2 is implemented in an integrated circuit, and integrated on the semiconductor chip 9 together with the magnetic sensor array 5. The angle detector unit 6 is surrounded by the rectangular frame shaped magnetic sensor array 5. This allows compact arrangement of the magnetic sensor array 5 and the angle detector unit 6.

Figure 3:
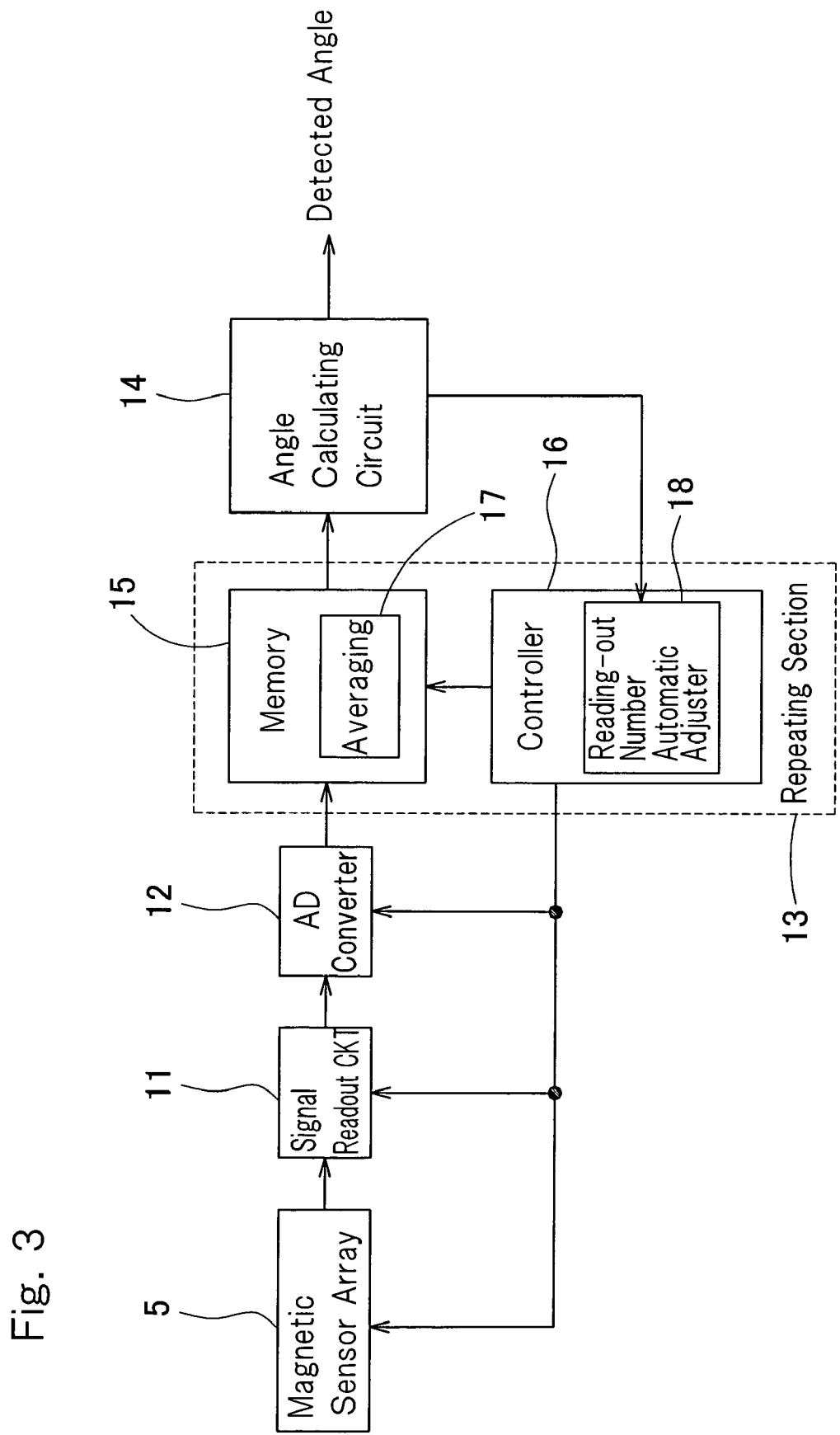
FIG. 3 is a block diagram showing a constitutional example of a signal processing section in the rotation sensing device in FIG. 1.

FIG. 3 shows an example of a schematic structure of the circuit on the semiconductor chip 9, in which absolute output can be obtained from the angle detector unit 6. The angle detector unit 6 includes a signal readout circuit 11 which reads an analog signal from the sensor array lines 5A to 5D of the magnetic sensor array 5, an A/D converter circuit 12 which converts the read analog signals into digital signals, a repeating section 13, and an angle calculating circuit 14.

The repeating section 13 has a memory 15 and a control circuit 16, and causes the signal readout circuit 11 to repeat reading out the signal from the magnetic sensor array 5 several number of times. The repeating section 13 also calculates a summation or an average of several readout signals. The memory 15 includes an averaging circuit 17 which integrates or averages the repeatedly readout signals. The control circuit 16 controls the magnetic sensor array 5, the signal readout circuit 11, the A/D converter circuit 12, and the memory 15, and has the reading-out number automatic adjuster 18. The reading-out number automatic adjuster 18 calculates a amount of change in angle representing a difference between two successive angles of rotation of the magnet 4 detected by the angle calculating circuit 14, and adjusts the number of times of reading-out the signal according to the amount of change in angle. The reading-out number automatic adjuster 18 has a table or a calculating formula for the relationship between the amount of change in angle and the number of times of reading-out the signal, and determines the number of times of reading by using the table or the calculating formula.

The angle calculating circuit 14 detects the angle of rotation of the magnet 4 from the summation or the average signals calculated by the repeating section 13.

The operation of the angle detector unit 6 will be described below. The magnetic sensor array 5 having a large number of magnetic sensor elements 19 is sequentially scanned, and analog signals are readout by the signal readout circuit 11. The read out analog signals are converted into digital signals by the A/D converter circuit 12 and then inputted to and stored in the memory 15. From the stored signals in the memory 15, the angle calculating circuit 14 detects the angle of rotation.

It should be noted that on the read out sensor signals, noise components generated by the magnetic sensor elements 19, noise components by the signal readout circuit 11, and noise components by the A/D converter circuit 12 are superimposed, and thus the read out sensor signals have time-fluctuated components. Hence, in the case that the angle of rotation is detected from such signals, detected results show fluctuations over time under the influence of noise, resulting in lowered accuracy. In the present embodiment, such influence of noise is reduced as described below.

Figure 4:
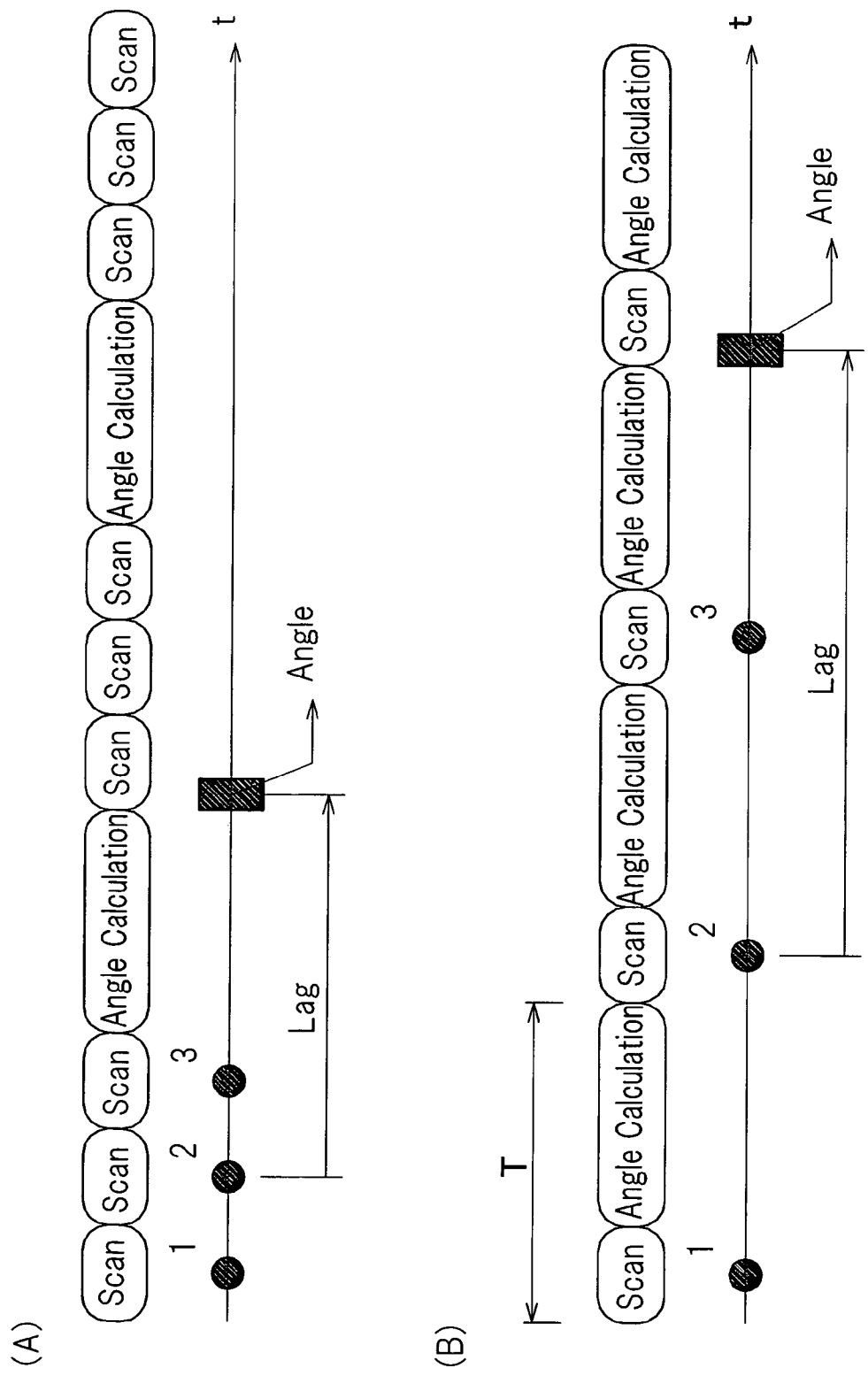
FIG. 4A is a time chart of signal processing by the signal processing section in the rotation sensing device in FIG. 1.
FIG. 4B is a time chart showing another example of the signal processing for reference.

As shown in FIG. 4A of a time chart, reading out (scanning) a signal from the magnetic sensor elements 19 is repeated n times (three times in the figure), and the averaging circuit 17 of the memory 15 in the repeating section 13 calculates an average or a summation of the n readout signals. Consequently, the noise of the readout signals is reduced. Such calculation of the average is executed as part of the signal reading-out operation. It is to be noted that the number of reading-out the signal is adjusted by the reading-out number automatic adjuster 18.

Upon completion of the predetermined number of times of scanning, the angle calculating circuit 14 detects the angle of rotation, using the calculated average. With the signals processed in this manner, process of angle detecting that takes a time longer than the scanning does is executed only once while the scanning is repeated n times. Consequently, extended amount of time required for outputting or detecting an angle of rotation is only (n−1) times of scanning. Thus, the time lag can be minimized.

For reference, there is another signal processing method of reducing noise as shown in FIG. 4B of a time chart. In this method, angles of rotation obtained by repeating several times of cycle consisting of a scanning and calculating angle are averaged (or integrated), to decrease deviations in obtained angles. In this method, the noise can be reduced through the use of each time of calculated angle, so as to simplify processing in which the averaging circuit 17 in FIG. 3 is not necessary and the averaging step can be executed outside the angle detector unit 6. However, this method requires n times of sequences (n cycles), each consisting of scanning and calculating angle, to obtain one angle of rotation, and thus having the drawback of the detection rate being reduced to 1/n. To avoid this drawback, a moving averaging technique in which the calculated angles of the last n times are averaged and outputted at the end of every calculating may be used so that the noise can be reduced without lowering the detection rate. However, since the moving averaging of the last n sequences (previous n cycles), each consisting of scanning and calculating angle, may result in not the current angle, but the angle assumed at the timing preceding generally n/2 cycle of the process, a time lag is caused.

In the present embodiment, since scanning of the sensed signal is repeated and following averaging is executed once as in FIG. 4A, the time lag is increased by the number of cycles of scanning as described above. This lag is insignificant when the magnet 4 as a sensing object gently rotates, but may be serious when the magnet 4 rotates at a high speed. Therefore, in the present embodiment, the number of scanning subject to averaging, namely the number of times of scanning preceding the calculation or detection of an angle of rotation, is varied in accordance with the moving speed of the object, to automatically set the optimum number of scanning so that a more desirable processing is executed.

Namely, the reading-out number automatic adjuster 18 of the repeating section 13 calculates a change in angle representing a difference between a previous detected angle stored in the memory 15 and a current detected angle calculated by the angle calculating circuit 14, to automatically adjust the number of times of reading-out the signal according to the amount of change in angle. The reading-out number automatic adjuster 18 performs such that the number of times of scanning is reduced when the change in angle is large, and increased when the change in angle is small. Thus, in the case of low-speed rotation when the noise reduction is most necessary, an angle is stably detected by sufficient noise reducing. In contrast, in the case of high-speed rotation where a higher speed response is required, an angle is detected with placing greater emphasis on reduction of time lag than the noise reduction.

Figure 5:
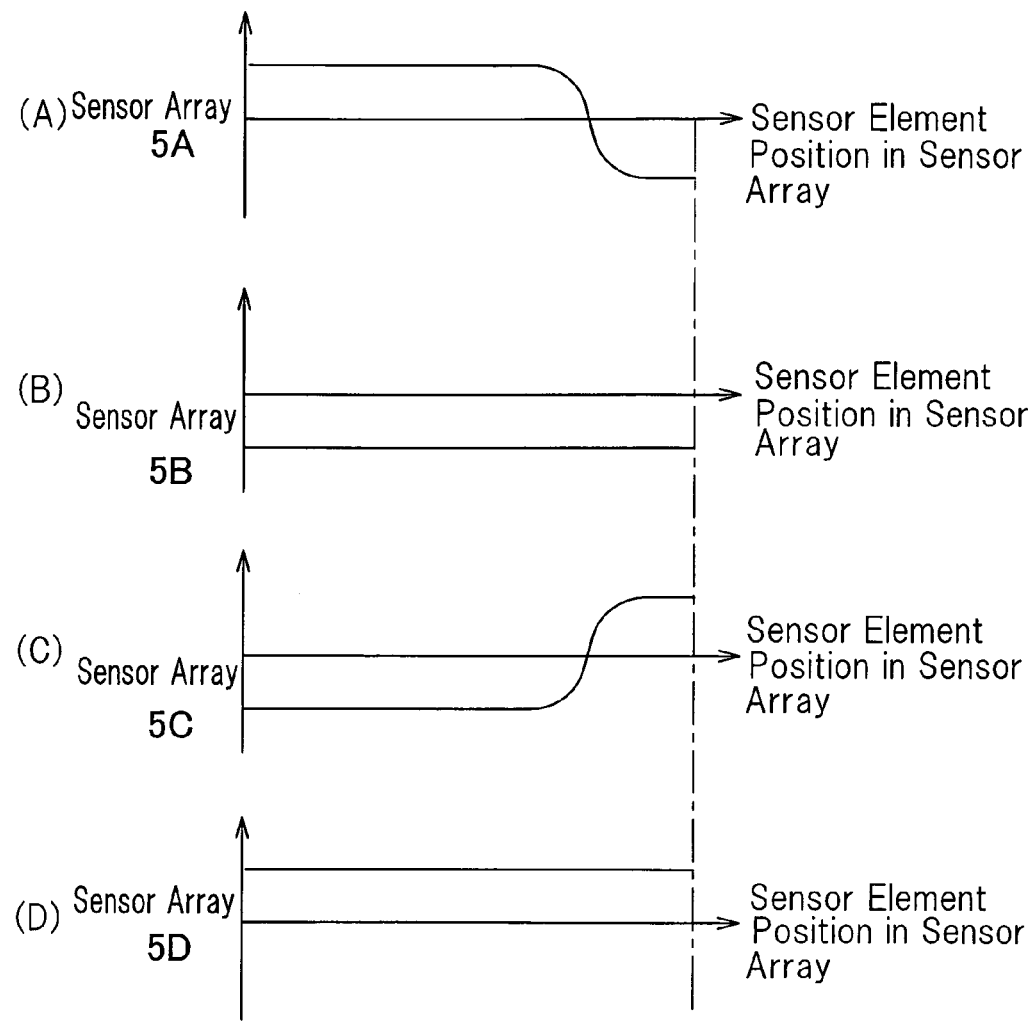
FIG. 5 is a chart showing waveforms of respective outputs of sensor array lines.
Figure 6:
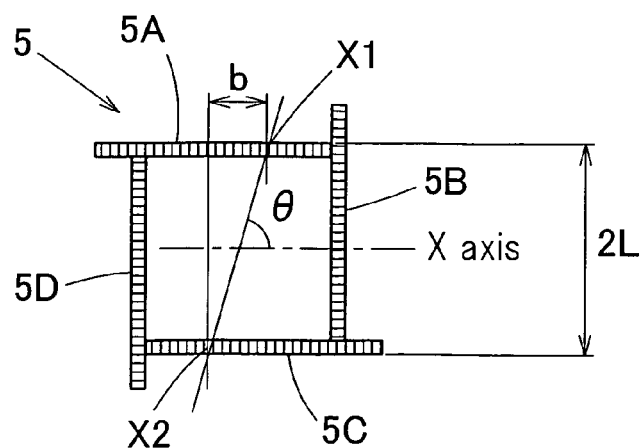
FIG. 6 is a explanatory diagram used to explain a principle of angle detection by an angle of rotation calculating circuit.

FIGS. 5 and 6 are explanatory diagrams used to explain a principle of detection in the angle calculating circuit 14. FIGS. 5A to 5D show output waveforms of the sensor array lines 5A to 5D of the magnetic sensor array 5 when the magnet 4 is rotating, where each axis of abscissa shows the sensor elements 19 on each of the sensor array lines 5A to 5D, and the axis of ordinate shows the intensity of the detected magnetic field (in the embodiment, the average for the number of times of scanning).

It is now assumed that zero-crossing positions, which are boundaries between the N-magnetic pole and the S-magnetic pole in the sensed magnetic field of the magnetic sensor array 5, lie at respective positions X1 and X2 shown in FIG. 6. In this condition, the outputs from the sensor array lines 5A to 5D of the magnetic sensor array 5 exhibit the respective signal waveforms shown in FIGS. 5A to 5D. Therefore, the zero-crossing positions X1 and X2 can be calculated by colinear approximation of the respective outputs from the sensor array lines 5A and 5C.

The angle is calculated using the following formula:

$$\theta = \tan^{-1}(2L/b)$$

In this equation, θ represents an absolute angle (absolute value) as the angle of rotation of the magnet 4. 2L represents the length of one side of the magnetic sensor array 5 arranged in a rectangular pattern. b represents the length in a transverse direction between the zero-crossing positions X1 and X2.

In a case where the zero-crossing positions X1 and X2 lie on the magnetic sensor arrays 5B and 5D, respectively, the angle of rotation θ can be calculated in the same manner as above based upon data of zero-crossing positions obtained from the respective outputs of the magnetic sensor arrays 5B and 5D.

Figure 7:
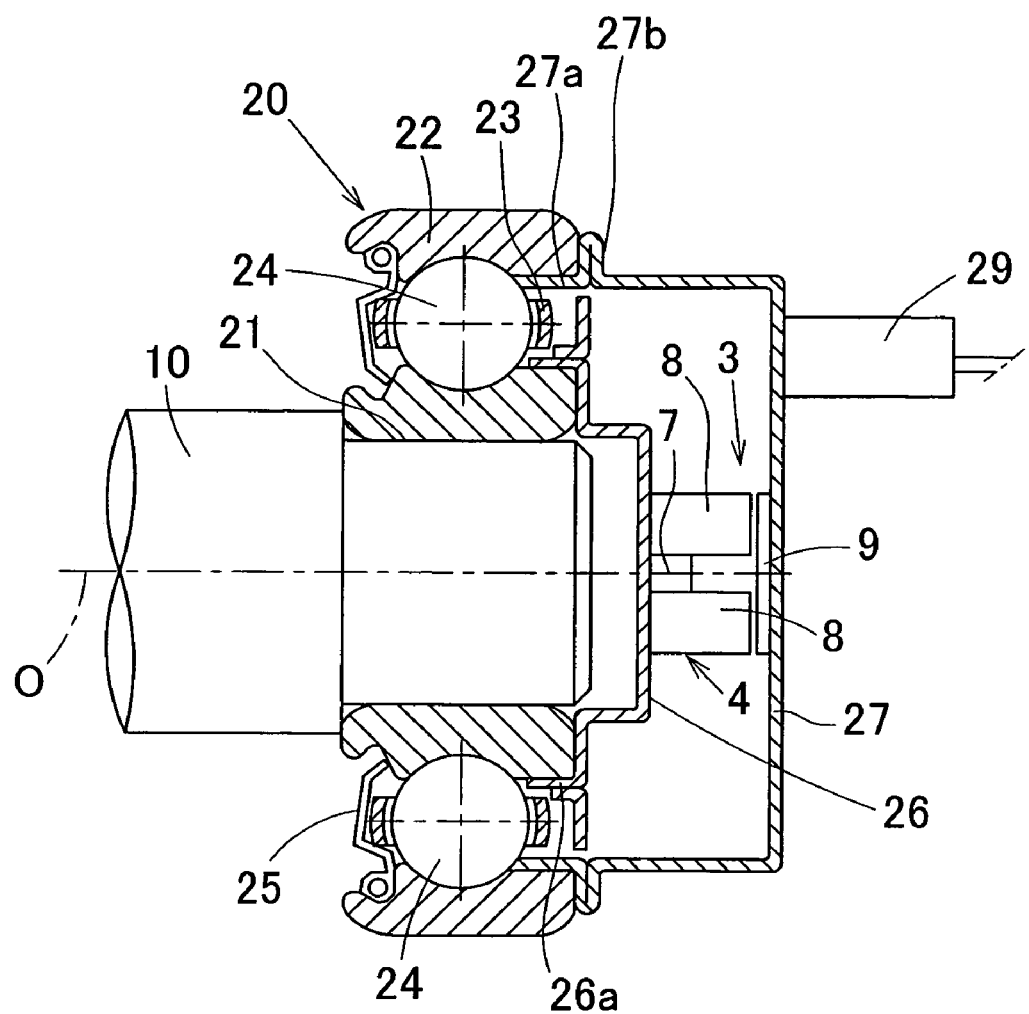
FIG. 7 is a sectional view showing one example of a rotating bearing assembly equipped with the rotation sensing device in FIG. 1.

FIG. 7 shows an example of incorporating the rotation sensing device 3 of the present embodiment into a rolling bearing assembly. This rolling bearing assembly 20 is formed by interposing rolling elements 24 retained by a retainer 23 between the respective rolling surfaces of an inner race 21 and an outer race 22. The rolling elements 24 are in the form of a ball, and this rolling bearing assembly 20 is rendered to be a deep groove ball bearing assembly. Also, a sealing member 25 covering one of opposite ends of a bearing space is fitted to the outer race 22. The inner race 21 mounted on a rotary shaft 10 for rotation together therewith is supported by the outer race 22 through a row of the rolling elements 24. The outer race 22 is installed in a housing (not shown) of equipment utilizing the bearing assembly.

A magnetic-generator fitting member 26 is fitted to the inner race 21, and the magnet 4 is fitted to this magnetic generator fitting member 26. The magnetic-generator fitting member 26 is provided so as to cover an inner diametric hole at one end of the inner race 21 and has a cylindrical portion 26a provided in an outer peripheral edge. This magnetic generator fitting member 26 is fitted to the inner race 21 with the cylindrical portion 26a thereof engaged around an outer peripheral surface of a shoulder of the inner race 21. Further, a side plate portion in the vicinity of the cylindrical portion 26a is engaged with an end face of the inner race 21 to position the inner race 21 in the axial direction.

The outer race 22 is fitted to a sensor attachment member 27, and the semiconductor chip 9 integrated with the magnetic sensor array 5 and the angle detector unit 6 of FIG. 1 is attached to this sensor attachment member 27. An output cable 29 for taking out an output of the angle detector unit 6 is also attached to this sensor attachment member 27. The sensor attachment member 27 has a cylindrical free end portion 27a formed in the outer periphery thereof, which is inserted into an inner diametric surface of the outer race 22. A collar 27b formed in the vicinity of the cylindrical free end portion 27a of the sensor attachment member 27 is engaged with an end face of the outer race 22 to position in the axial direction.

Integrating the rotation sensing device 3 with the rolling bearing assembly 20 in the manner described above is effective to reduce the number of components of equipment using the bearing assembly and the number of assembling steps thereof, and also to achieve reduction in size of the bearing assembly. In such a case, even though the rotation sensing device 3 is used in a small-sized bearing such as a small-diameter bearing, since the rotation sensing device 3 is small-sized and capable of outputting an angle of rotation with high accuracy, it is possible to obtain output of an angle of rotation with high precision.

Although the present invention has been fully described in connection with the preferred embodiment thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A rotation sensing device, comprising:
    a magnetic sensor array including magnetic sensor elements in line;
    a rotatable magnet confronting the magnetic sensor array;
    a signal readout circuit to read out a signal from the magnetic sensor array;
    a repeating section to cause the signal readout circuit to repeat reading out the signal from the magnetic sensor array several number of times, and to calculate a summation or an average of the several readout signals;
    an angle calculating circuit to detect an angle of rotation of the magnet from the summation or the average of the signals calculated by the repeating section; and
    a reading-out number automatic adjuster to adjust the number of times of reading-out the signal used by the repeating section in accordance with an amount of change in angle, the amount of change in angle representing a difference between successive angles of rotation of the magnet detected by the angle calculating circuit.

2. The rotation sensing device according to claim 1, wherein the reading-out number automatic adjuster reduces the number of times of reading-out the signal when the amount of change in angle is large, and increases the number of times of reading-out the signal when the amount of change in angle is small.

3. The rotation sensing device according to claim 1, wherein the repeating section includes a memory that calculates the summation or the average of the read-out signals and then stores the summation or the average of the signals.

4. A bearing assembly equipped with the rotation sensing device according to claim 1.

5. The bearing assembly according to claim 4, wherein the magnet is arranged on a rotatable raceway member while the magnetic sensor array is arranged on a stationary raceway member.

* * * * *